United States Patent
Gerdes et al.

[11] Patent Number: 6,029,914
[45] Date of Patent: Feb. 29, 2000

[54] CORNER IRRIGATION SYSTEM

[75] Inventors: Jerry D. Gerdes; Rudy R. Unruh, both of Omaha, Nebr.

[73] Assignee: Valmont Industries, Inc., Valley, Nebr.

[21] Appl. No.: 09/152,418

[22] Filed: Sep. 14, 1998

[51] Int. Cl.[7] .................................................. B05B 3/00
[52] U.S. Cl. ........................................ 239/728; 239/729
[58] Field of Search .................................. 239/728, 729, 239/561, 726, 722

[56] References Cited

U.S. PATENT DOCUMENTS

| | | | |
|---|---|---|---|
| 2,919,861 | 1/1960 | Meek | 239/561 X |
| 3,901,442 | 8/1975 | Chapman | 239/728 X |
| 3,902,668 | 9/1975 | Daugherty et al. | 239/177 |
| 4,161,292 | 7/1979 | Holloway et al. | 239/11 |
| 4,227,648 | 10/1980 | Holloway et al. | 239/11 |
| 4,549,694 | 10/1985 | Davis et al. | 239/729 |
| 4,729,514 | 3/1988 | Ostrom et al. | 239/727 |
| 5,246,164 | 9/1993 | McCann et al. | 239/729 X |
| 5,435,495 | 7/1995 | Davis | 239/728 |
| 5,518,577 | 5/1996 | Jinbo et al. | 239/561 X |
| 5,678,771 | 10/1997 | Chapman | 239/727 |

*Primary Examiner*—David J. Walczak
*Attorney, Agent, or Firm*—Zarley, McKee, Thomte Voorhees & Sease; Dennis L. Thomte

[57] ABSTRACT

An irrigation system is disclosed which includes a center pivot support having an elongated main water boom pivotally connected thereto which extends outwardly therefrom. An elongated extension boom is pivotally connected at its inner end to the outer end of the main boom and is supported by a steerable drive tower. A corner arm sensor is provided for sensing the angle of the extension boom with respect to the main boom. A plurality of first sprinklers are positioned on the extension boom along the length thereof, the nozzle size of which increases from the inner end of the extension boom to the outer end thereof. A plurality of second sprinklers are also positioned on the extension boom along the length thereof, the nozzle size of which increases from the outer end of the extension boom to the inner end thereof. By utilizing the two lines of sprinklers in combination, the proper amount of water can be applied for all corner arm positions.

4 Claims, 7 Drawing Sheets

CORNER IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved means for controlling the distribution of water from the corner span.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668.

A plurality of spaced-apart sprinklers are provided on the main boom as well as on the extension boom. The sprinklers on the extension boom are not activated until the extension boom moves out into the corners of the field. A difficulty arises in providing uniform water distribution in the corner areas of the field due to the fact that the sprinklers on the extension boom are covering varying areas of the field when the extension boom is beginning to move out into the corner of the field than when the extension boom is fully extended. The same is also true when the extension arm is retracting from its fully extended position.

Heretofore, groups of sprinklers on the extension boom were switched on or off, depending upon the angle the extension boom made with the main boom. This resulted in some overwatering and some underwatering, depending upon the position of the extension boom.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. An elongated extension boom, having inner and outer ends, is pivotally connected at its inner end to the outer end of the main boom with the extension boom comprising an elongated extension water pipe supported upon at least one steerable drive tower.

A plurality of spaced-apart sprinklers are provided on the main boom for irrigating the field beneath the main boom. Two lines of variable rate or pulsed rate sprinklers are provided along the length of the extension boom. One of the lines has sprinklers that increase in nozzle size from the inner end of the extension boom to the outer end of the extension boom, and the other line has sprinklers that decrease in size from the outer end of the extension boom to the inner end of the extension boom. The utilization of the two lines in combination with one another results in the proper amount of water being applied for all extension boom positions.

It is therefore a principal object of the invention to provide an improved means for irrigating the corner areas of a field wherein overwatering and underwatering are eliminated.

A further object of the invention is to provide a corner irrigation system which utilizes two water lines on the extension boom with one of the lines having sprinklers that increase in nozzle size from the inner end to the outer ends of the extension boom with the other line having sprinklers that decrease in nozzle size from the outer to inner ends of the extension boom.

These and other objects will be apparent to those skilled in the art.

DESCRIPTION OF THE PREFERRED EMBODIMENT

Figure 1:
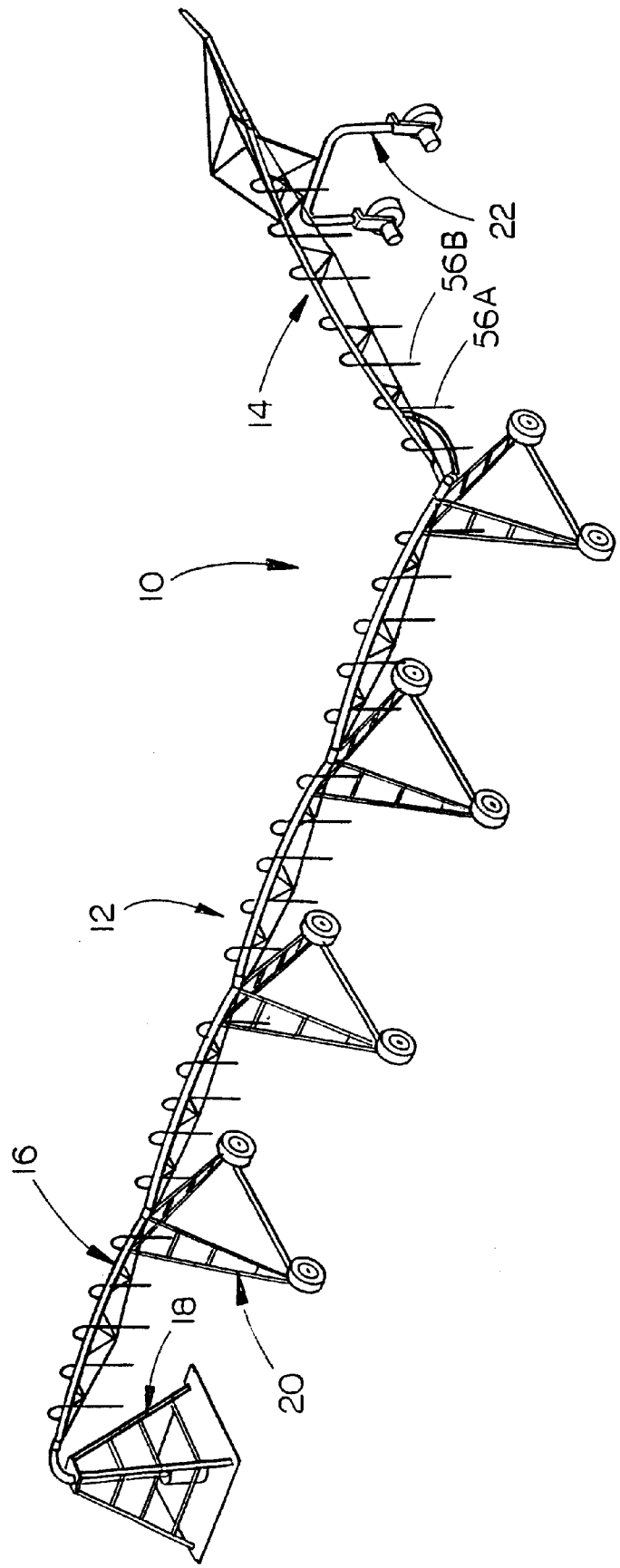
FIG. 1 is a perspective view of a center pivot irrigation system having a corner span pivotally mounted to the outer end thereof.

The numeral 10 refers generally to a self-propelled irrigation system which is comprised of a center pivot irrigation system 12 having a corner arm irrigation system or extension boom 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. corner arm, corner span, corner boom or extension boom 14 is supported upon a steerable drive tower 22.

Figure 2:
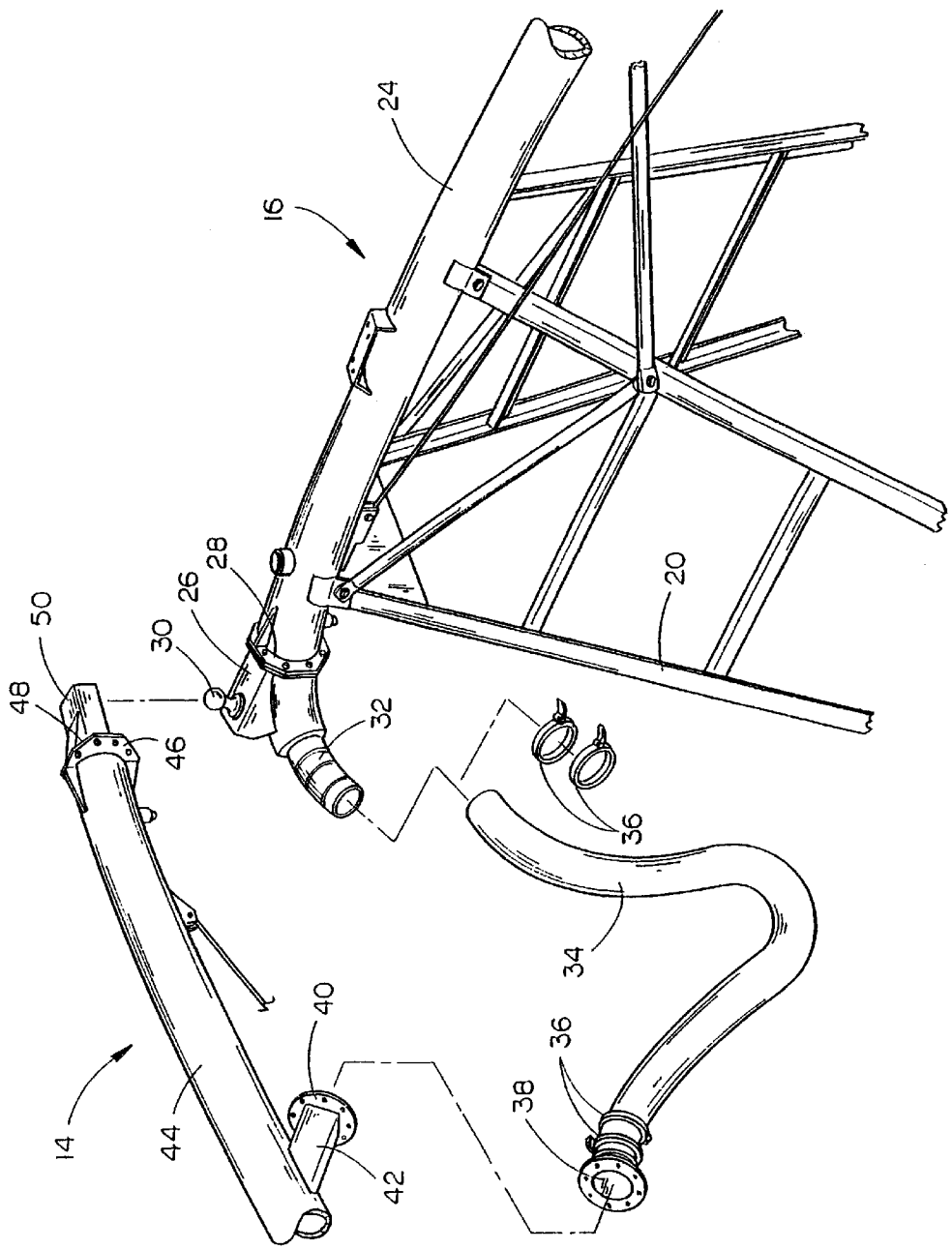
FIG. 2 is an exploded perspective view of the connection between the main boom and extension boom.
Figure 3:
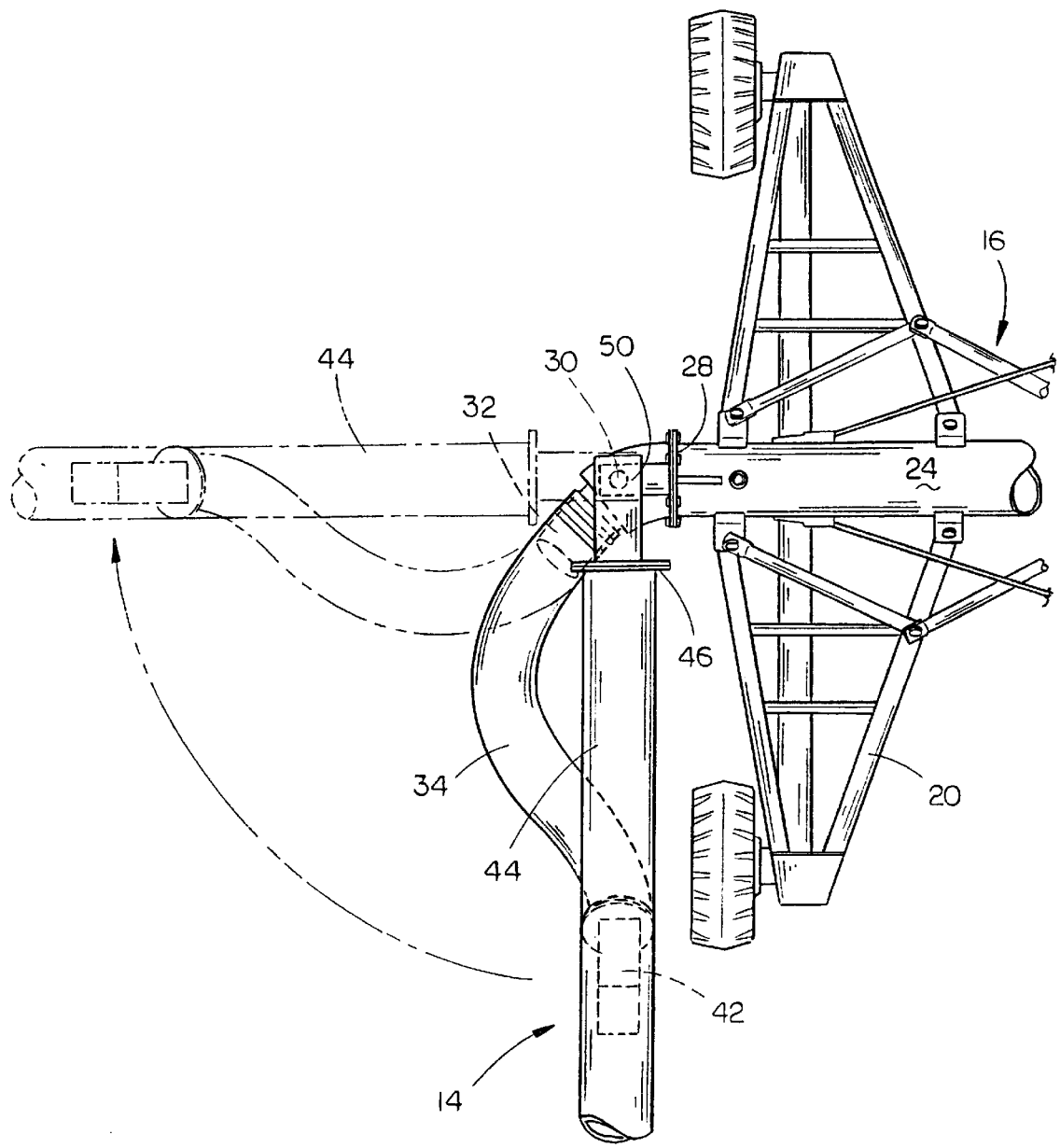
FIG. 3 is a top elevational view of the connection of FIG. 2 with the broken lines illustrating the corner arm water conduit in its completely extended position.
Figure 4:
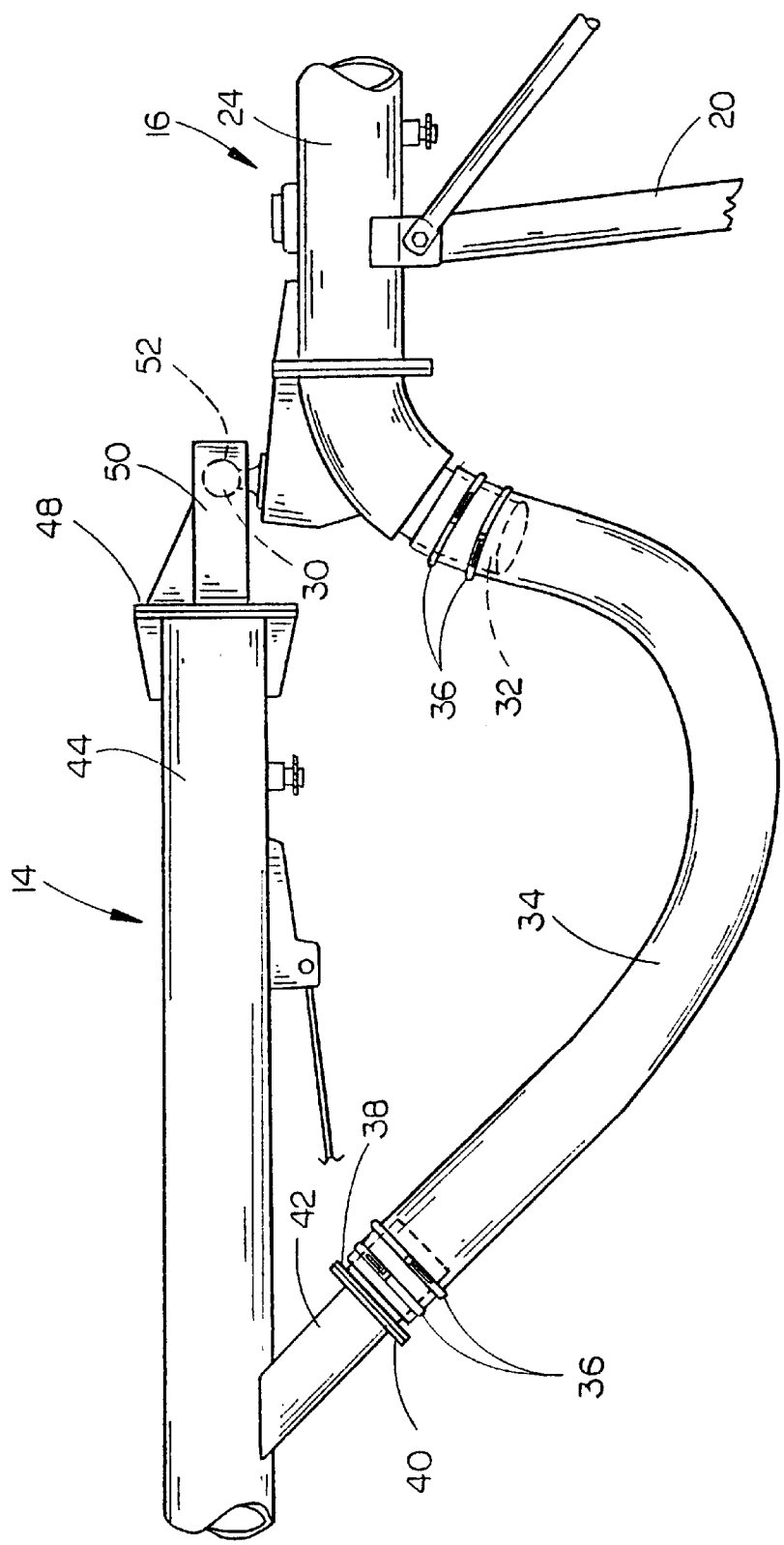
FIG. 4 is a side elevational view of the connection of FIG. 2.

Referring to FIG. 2, the numeral 24 refers to the outermost pipe section of the main boom 16. Support 26 is secured to the annular plate 28 mounted at the outer end of pipe section 24 and has a hitch ball 30 mounted thereon. Support 26 includes an arcuate pipe or elbow section 32 which extends downwardly, outwardly and rearwardly from the pipe section 24, as seen in FIG. 2. One end of connecting hose 34 is mounted on elbow 32 and is maintained thereon by conventional retainers 36. The other end of hose 34 has a flanged pipe 38 secured thereto which is adapted to be secured to the flange 40 which is mounted on the lower inner end of tubular member 42 which extends downwardly from the inner end of the water conduit 44 of corner arm 14. The inner end of water conduit or pipe 44 is provided with an annular flange 46 which is sealed by means of plate 48 having beam 50 extending therefrom. The underside of beam 50 is provided with a ball-shaped pocket 52 which is adapted to receive the hitch ball 30, as illustrated in FIG. 4.

Figure 5:
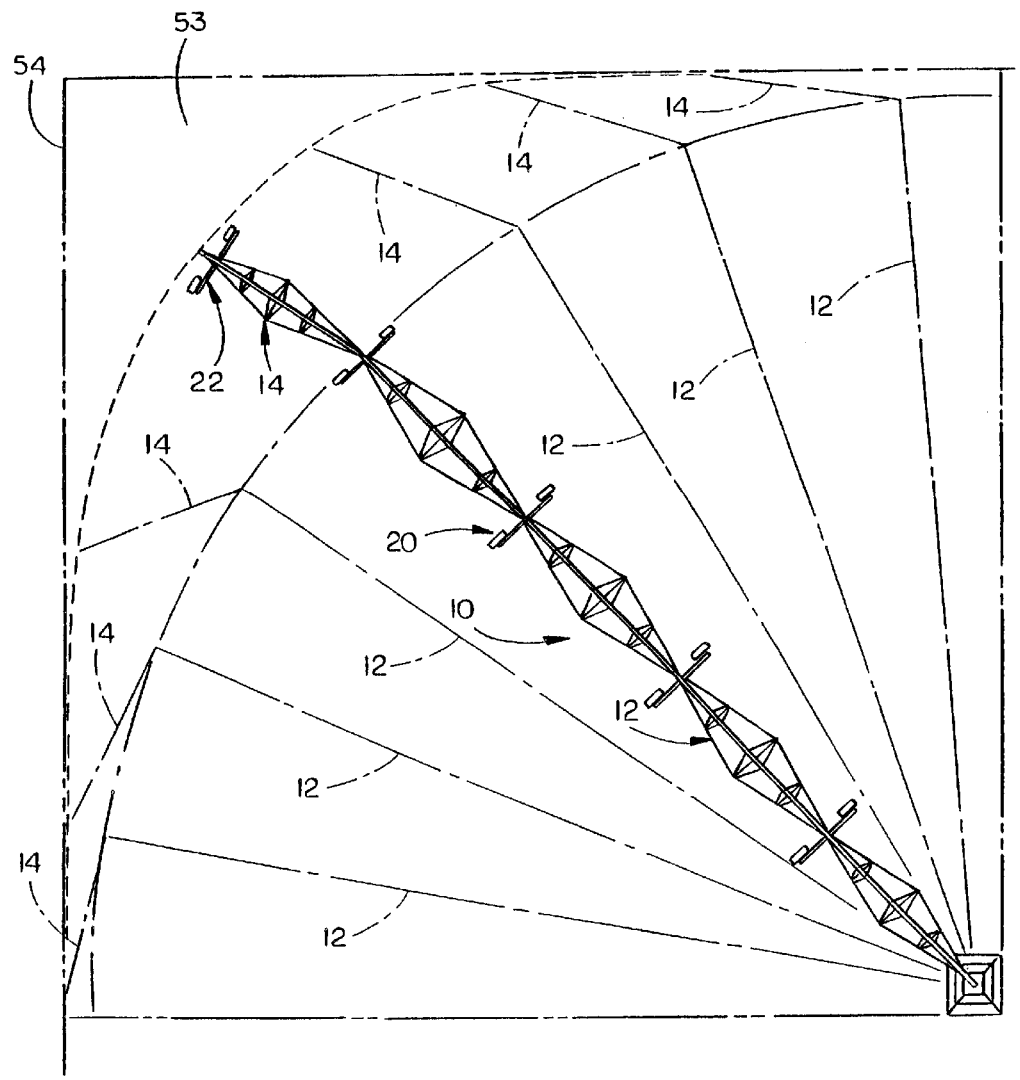
FIG. 5 is a plan view illustrating the corner arm irrigation system of this invention.
Figure 6:
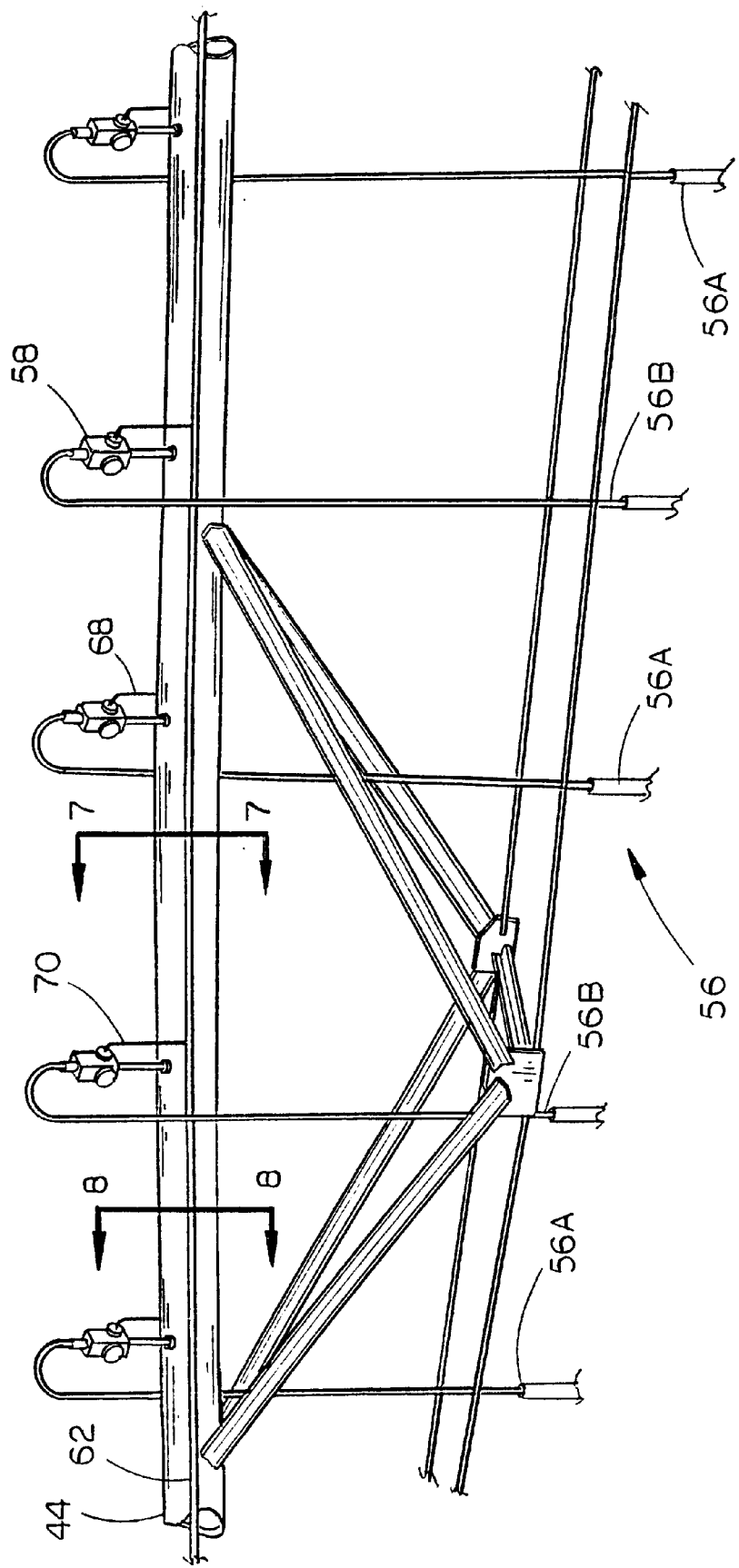
FIG. 6 is a partial perspective view of the extension boom having two sprinkler lines provided thereon.
Figure 8:
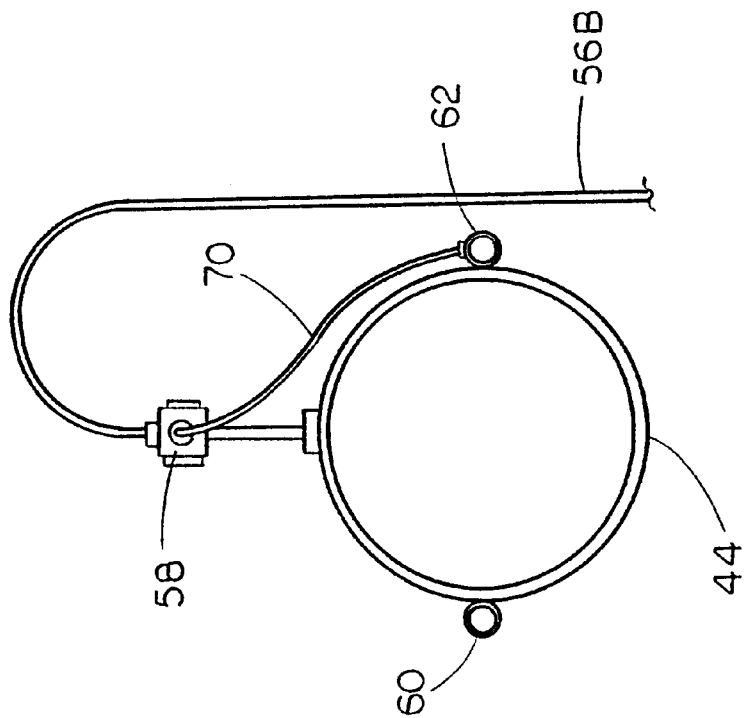
FIG. 8 is a sectional view as seen on lines 8—8 of FIG. 6.
Figure 7:
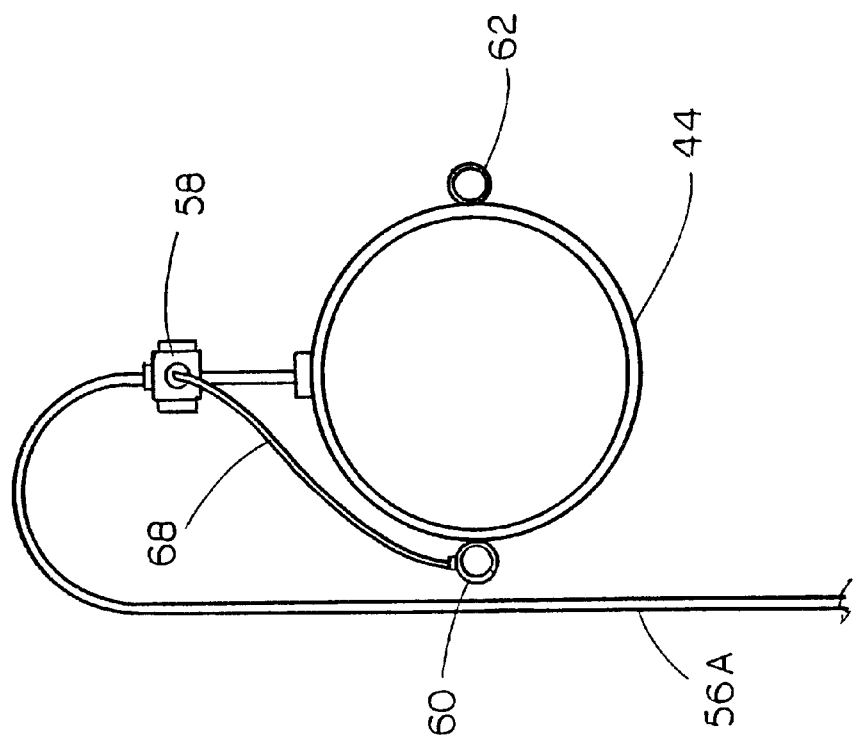
FIG. 7 is a sectional view as seen on lines 7—7 of FIG. 6.

As illustrated in FIG. 5, the corner arm 14 trails the main arm and is moved out into the corners 53 of the field 54 so that the corners of the field may be irrigated in conventional fashion. Corner arm 14 includes an extension water pipe 44, as previously described, which has a plurality of spaced-apart sprinklers 56 positioned thereon. Each of the sprinklers 56 is preferably of the variable rate or pulsed rate type and is individually controlled by means of a combination hydraulic/solenoid valve 58, or similar control, provided thereon.

For purposes of description, the sprinklers 56 will be described as comprising sprinklers 56A and 56B. A first hydraulic pilot tube 60 is positioned at one side of pipe 44 and runs the length thereof while a second hydraulic pilot tube 62 is positioned at the other side of pipe 44. Hydraulic pilot tubes 68 extend from tube 60 to the valves 58 on sprinklers 56A while hydraulic pilot tubes 70 extend from tube 62 to valves 58 on sprinklers 56B. The sprinklers 56A are commonly controlled and the sprinklers 56B are commonly controlled. In other words, sprinklers 56A may be on while sprinklers 56B are off, and vice versa. The nozzle size of sprinklers 56A increase in size from the inner end of the extension boom to the outer end thereof. The nozzle size of the sprinklers 56B increase in size from the outer end of the extension boom to the inner end thereof. The actuation of the sprinklers 56A and/or sprinklers 56B may be controlled by any conventional means such as the commonly used corner angle sensor which senses the angle of the extension boom with respect to the main boom. By using the two lines of sprinklers in combination, the proper amount of water can be applied for all corner arm positions.

Thus it can be seen that the invention accomplishes at least all of its stated objectives.

We claim:

1. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe supported upon at least one steerable drive tower including steering means;

said extension water pipe having inner and outer ends;

guidance means for controlling said steering means so that said steerable drive tower is moved along a preselected path, as said main boom travels over the field to be irrigated, thereby causing said extension boom to pivotally move with respect to said main boom to cause said extension boom to pivotally extend out into corner areas of the field and pivotally retract therefrom as said main boom travels through the field;

a plurality of first sprinklers mounted on said extension water pipe along the length thereof in a spaced-apart relationship;

a plurality of second sprinklers mounted on said extension water pipe along the length thereof in a spaced-apart relationship;

the amount of output of the said first sprinklers increasing from said inner end of said extension water pipe to the said outer end thereof;

the amount of output of the said second sprinklers increasing from said outer end of said extension water pipe to the said inner end thereof;

and means for independently controlling the operation of said first sprinklers and said second sprinklers.

2. The system of claim 1 wherein said first and second sprinklers comprise variable rate sprinklers.

3. The system of claim 1 wherein said first and second sprinklers comprise pulsed rate sprinklers.

4. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe supported upon at least one steerable drive tower including steering means;

said extension water pipe having inner and outer ends;

guidance means for controlling said steering means so that said steerable drive tower is moved along a preselected path, as said main boom travels over the field to be irrigated, thereby causing said extension boom to pivotally move with respect to said main boom to cause said extension boom to pivotally extend out into corner areas of the field and pivotally retract therefrom as said main boom travels through the field;

a plurality of first sprinklers mounted on said extension water pipe along the length thereof in a spaced-apart relationship;

a plurality of second sprinklers mounted on said extension water pipe along the length thereof in a spaced-apart relationship;

each of said first and second sprinklers having nozzles;

the nozzle size of said first sprinklers increasing from said inner end of said extension water pipe to said outer end thereof;

the nozzle size of said second sprinklers increasing from said outer end of said extension boom to said inner end thereof.

* * * * *